United States Patent [19]

Ryan

[11] 4,229,830

[45] Oct. 21, 1980

[54] APPARATUS AND METHOD FOR PROVIDING A MODULATION FORMAT FOR MULTIPLE WIDEBAND SIGNAL TRANSMISSION

[75] Inventor: John O. Ryan, Cupertino, Calif.

[73] Assignee: Ampex Corporation, Redwood City, Calif.

[21] Appl. No.: 44,730

[22] Filed: Jun. 1, 1979

[51] Int. Cl.³ .............................................. H04B 9/00
[52] U.S. Cl. ..................................... 455/608; 358/13; 370/8; 370/11
[58] Field of Search .......................... 250/199; 358/13; 179/15 AW, 15 BM

[56] References Cited

FOREIGN PATENT DOCUMENTS 2343384 9/1977 France ......................................... 358/13

Primary Examiner—Howard W. Britton
Attorney, Agent, or Firm—George B. Almeida

[57] ABSTRACT

A modulation format for containing, for simultaneously transmitting via a single optical fiber, and for decoding, multiple independent wideband signals. The format derives maximum advantage from the inherent wideband properties of the optical fiber, while utilizing the concept that the signal-to-noise ratio of one channel (e.g., in a red, green, and blue color video signal) is preferably made substantially greater than that for the other two channels. This allows optimizing the signal-to-noise ratio of the signal channels while using a relatively simplified circuit implementation. To this end, the format waveform employs a stationary reference edge and multiple time-variable edges, wherein the time interval between the reference edge and the following time-variable edge of the same polarity always exceeds, or always is less than, one-half of the total available time period of the waveform. That is, the next time-variable edge of the same polarity as the stationary reference edge never crosses the half-way point of the total time period of the waveform in the course of being deviated. The above conditions allow a relatively simplified edge discrimination scheme and demultiplexing circuit.

28 Claims, 12 Drawing Figures

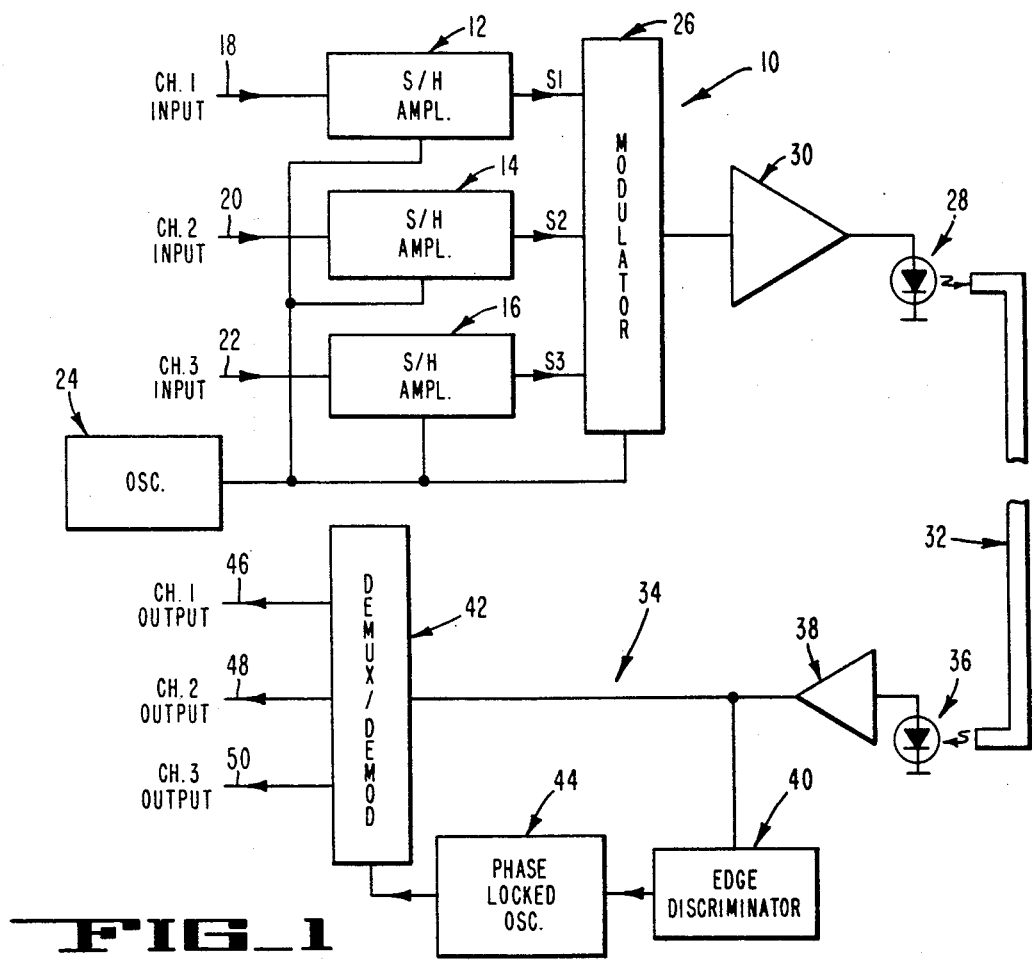
FIG_1
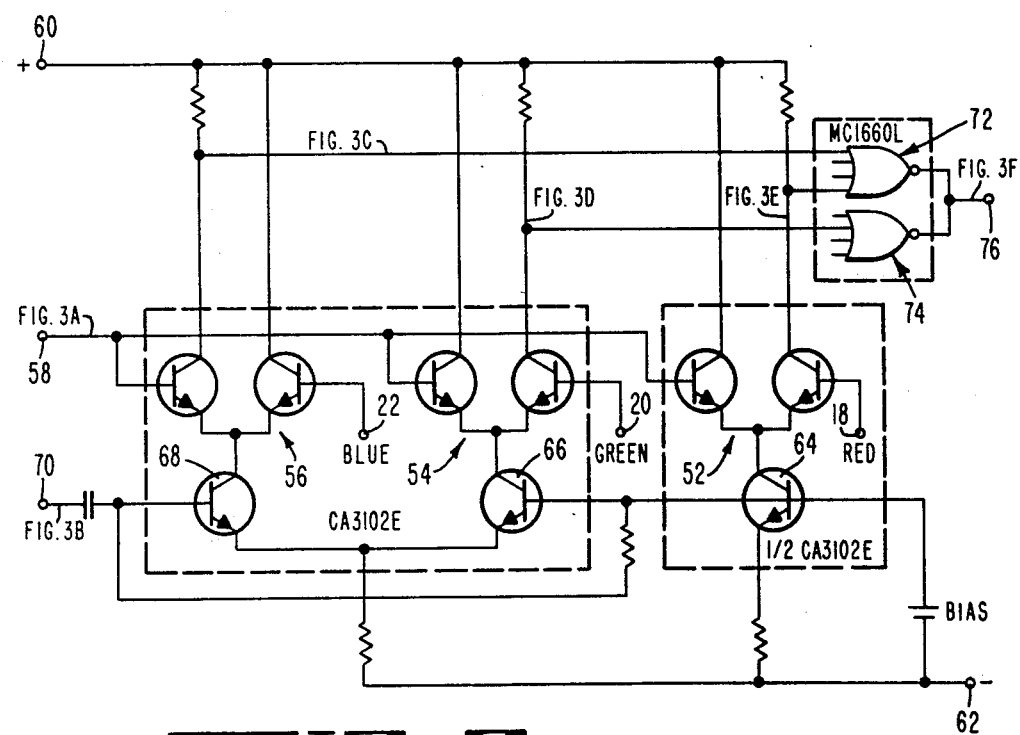
FIG_2

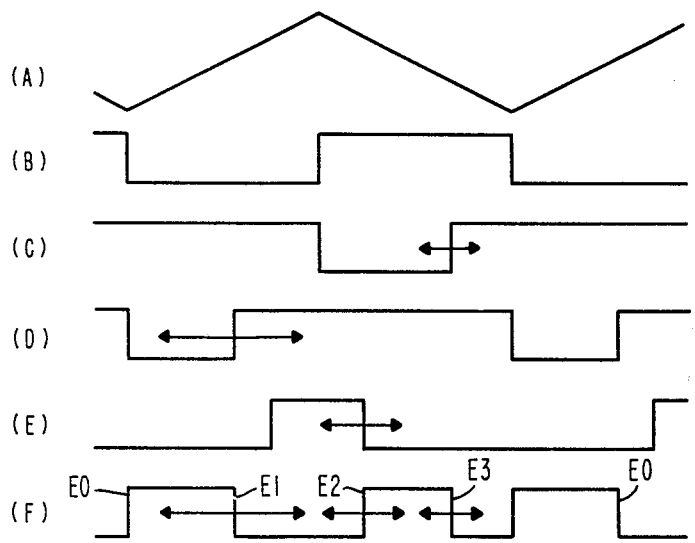
FIG_3
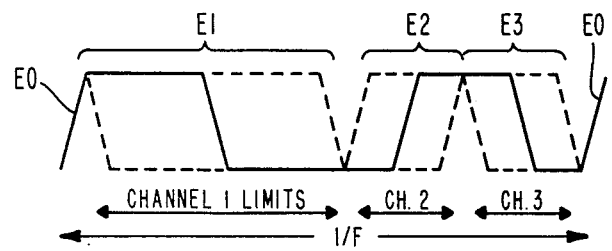
FIG_4
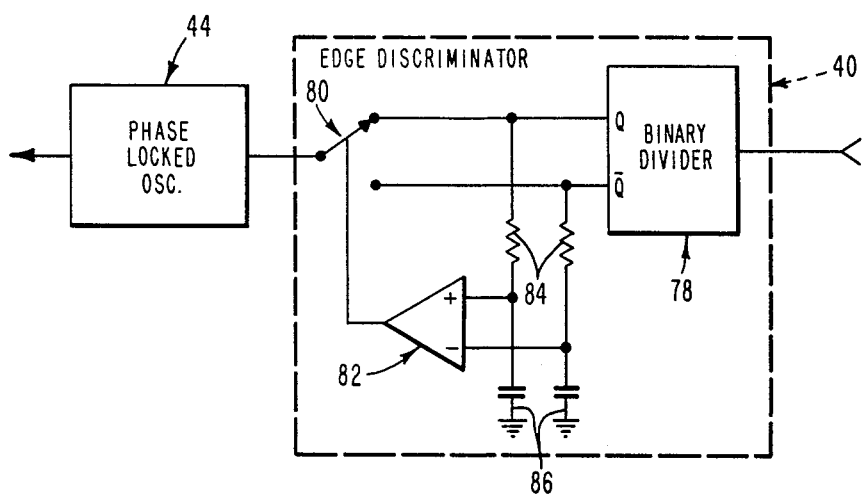
FIG_5

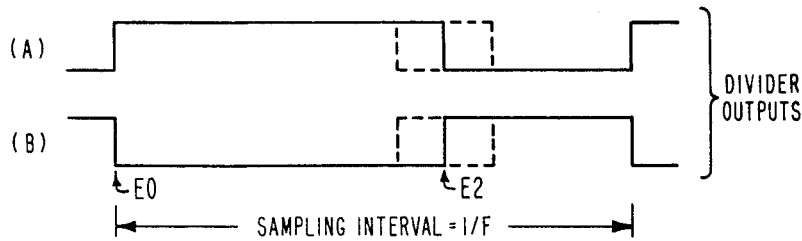
FIG_6
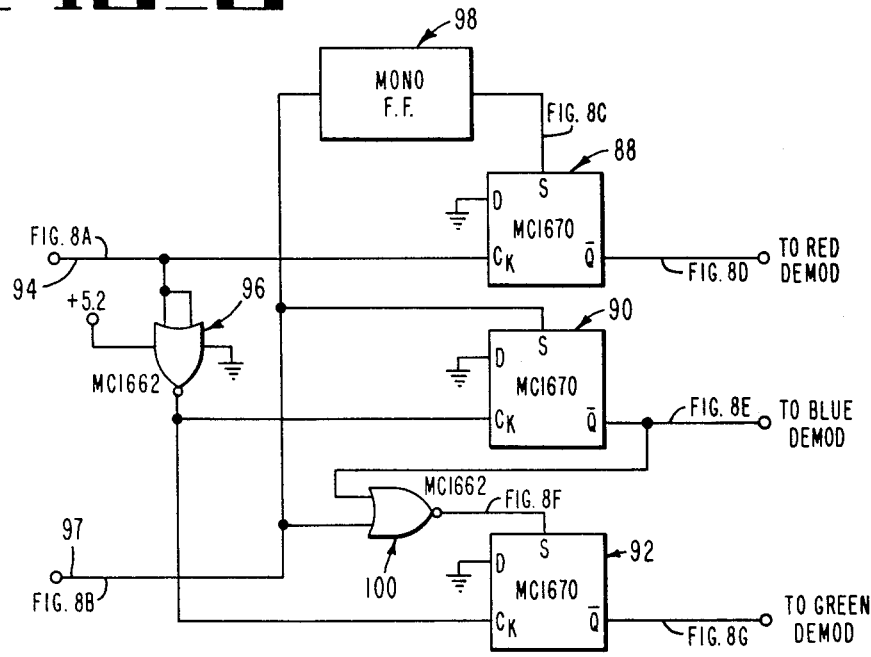
FIG_7
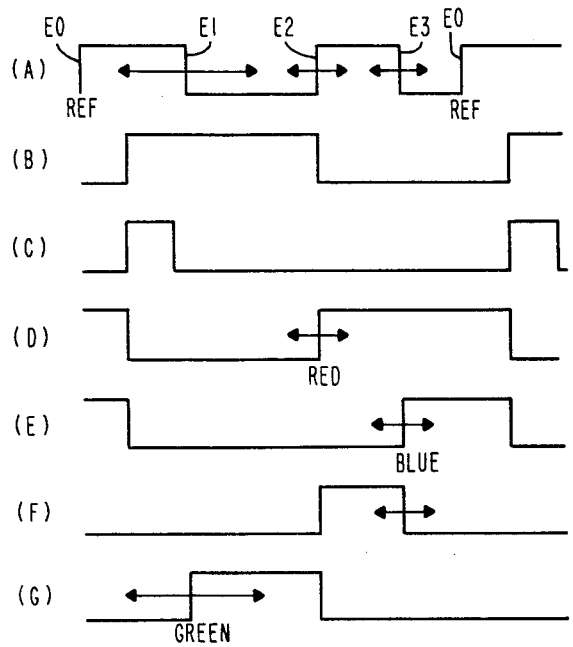
FIG_8

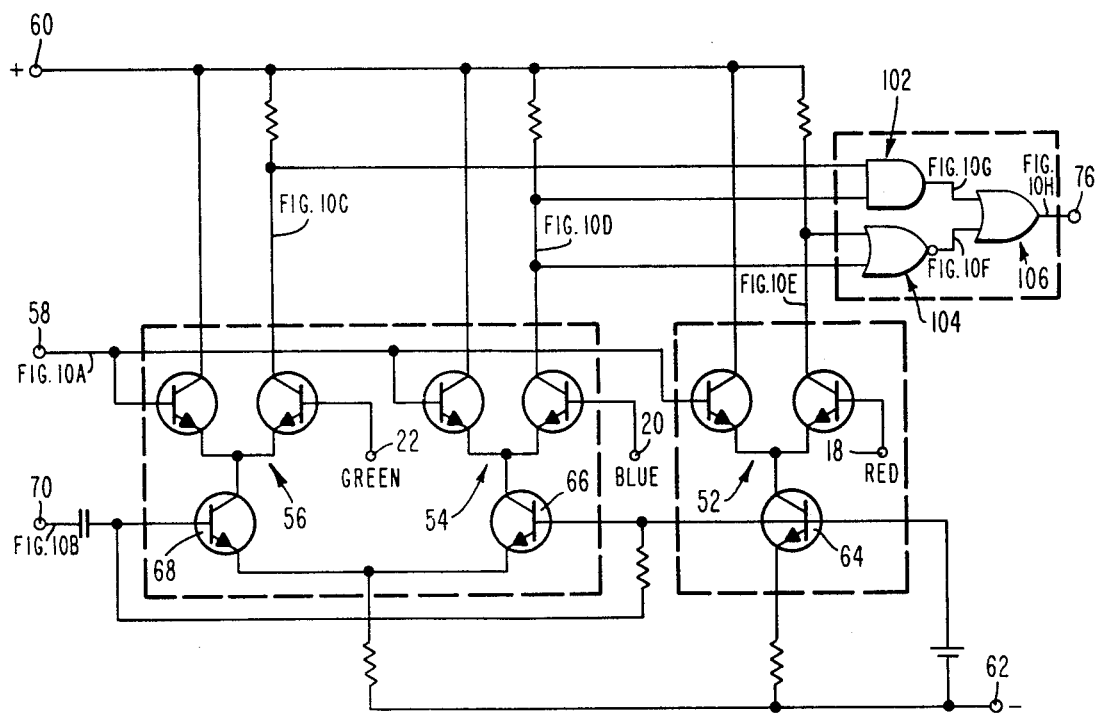
FIG_9
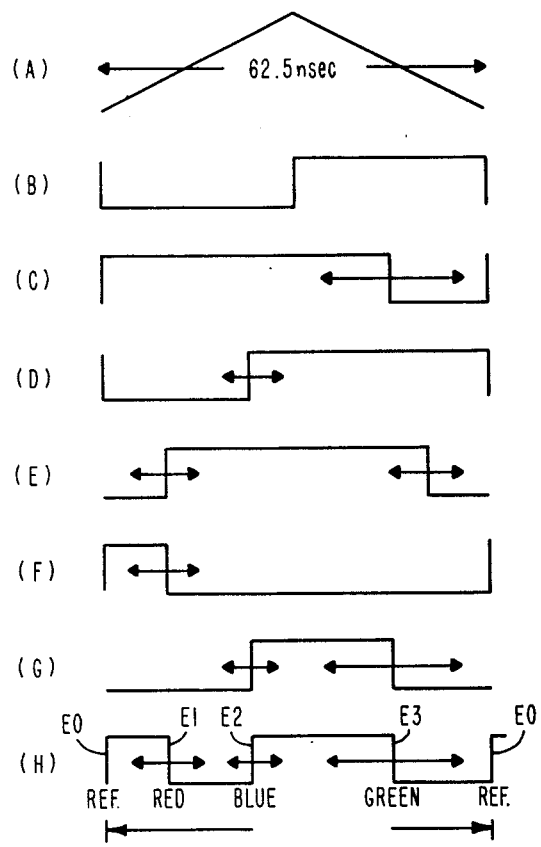
FIG_10

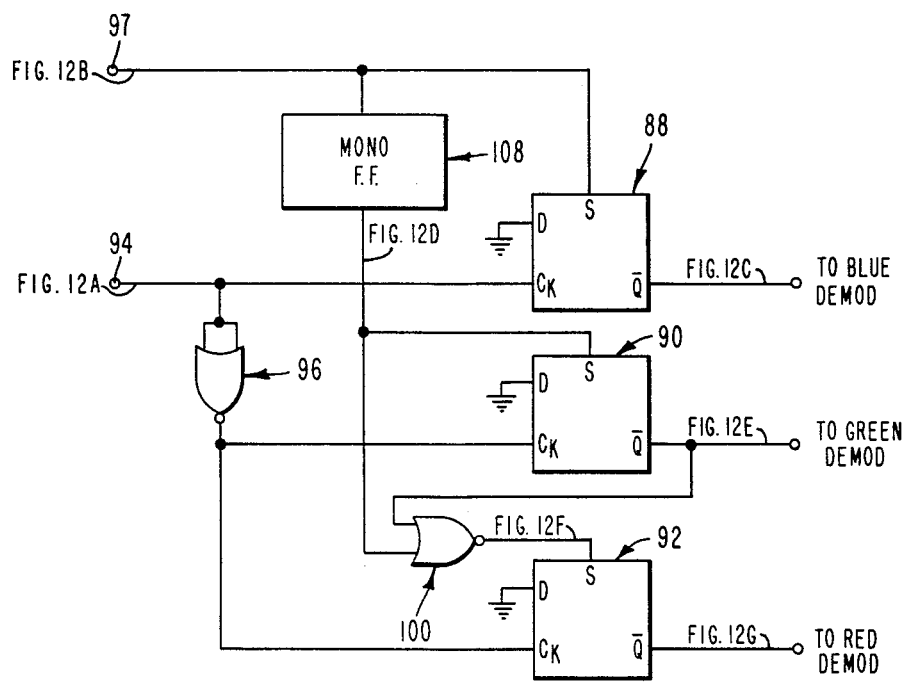
FIG_11
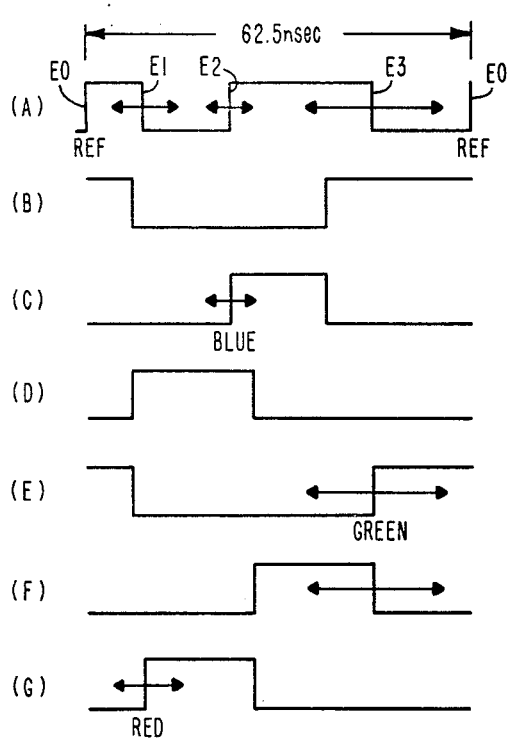
FIG_12

APPARATUS AND METHOD FOR PROVIDING A MODULATION FORMAT FOR MULTIPLE WIDEBAND SIGNAL TRANSMISSION

BACKGROUND OF THE INVENTION

1. Field

The invention relates to the multiplexed transmission of wideband signals and, more particularly, to the generation of an improved modulation format, and to the transmission of multiple wideband video signals from a video camera via a single optical fiber.

2. Prior Art

Traditionally, wideband signals, such as color video signals generated by a broadcast television camera, are transmitted from the camera to the central processing unit via a multiple conductor (coaxial) cable. Such scheme requires massive amounts of equalization to correct for the losses in the cable. The equalization has to be switched in and out depending upon the length of the cable used. Disadvantageously, even the very best equalizers produce a large amount of unexceptable distortion. Additionally, the cable itself is bulky and cumbersome to handle.

In a more sophisticated approach, the wideband signals are transmitted via a triax system, which involves modulating the multiple wideband signals on various AM or FM carriers and transmitting them via a single, very large diameter coaxial cable. This scheme requires complex and expensive design work, with a corresponding use of expensive hardware to implement.

In a third approach, a fiber optical cable may be used to derive the advantage that much larger distances may be realized with minimum distortion and with extremely wide signal bandwidth capabilities. However, for a straightforward application, multiple signals require multiple fibers within the cable, with corresponding multiple connectors at either end thereof. This is advantageous, since optical fibers are presently very expensive. In addition, two copper wires are required for power transmission. Such a multiple optical fiber cable configuration is therefore also undesirable.

Thus, it is preferable to transmit the multiple signals via a single optical fiber cable to minimize the expense and the number of optical fibers and connectors. In one scheme using a single optical fiber cable, one signal is transmitted as a pure baseband signal, and the remaining signals are transmitted on some given type of FM or AM carriers. However, the light generating laser diode generally used in such a scheme is rather a non-linear device which tends to generate massive intermodulation distortion, i.e., excessive crosstalk between channels, unless the relative levels of the carriers are carefully limited. This in turn reduces the carrier levels, which undesirably degrades the signal-to-noise ratio.

SUMMARY OF THE INVENTION

It is an object of the invention to overcome the disadvantages of the prior art by providing an improved modulation format, medium and technique for the multiplexed transmission via a conductor, of wideband video signals generated by, for example, a color video camera.

Another object of the invention is to provide an apparatus and method for generating and decoding a modulation format which derives maximum advantage from the inherent wideband properties of optical fibers.

A further object of the invention is to provide an improved modulation format of optimized efficiency, utilizing a relatively simple demultiplexing procedure and circuitry made possible because of the configuration of the format waveform.

To these ends, in one embodiment, red, green, and blue (RGB) video signals are fed via respective channels to sample/hold circuits which are driven by a clock frequency F meeting the Nyquist criterion. The sampled video signals S1, S2 and S3 are modulated, whereby the output thereof describes a waveform of time period 1/F with a stationary reference edge E0, and time variable edges E1, E2 and E3, wherein edges E0 and E2 have the same polarity. The positions of the edges E1, E2, and E3 with respect to edge E0 are allowed to time vary, i.e., deviate, as much as possible in response to the respective sampled video signals S1, S2 and S3. The total time available for deviation is equal to the sampling interval 1/F less the sum of the risetimes of the edges E0, E1, E2 and E3, whereby only the risetime of the reference edge E0 is "wasted".

Upon transmission via a single optical fiber, the waveform is demultiplexed and demodulated by identifying the reference edge E0, and then using it to phase-lock an oscillator running at frequency F. Edges E0 and E2 have the same polarity whereby in order to discriminate between them, in one embodiment, the allotted deviation time of the generated waveform is such that the interval between edges E0 and E2 always exceeds one-half of the total waveform period 1/F. This allows a simple demultiplexing procedure, wherein a binary divider with complimentary outputs triggering on the edges E0 and E2 generates a greater average D.C. value on that output which goes positive in response to the reference edges E0. The outputs are compared, and E0 is identified by selecting the output with the greatest average D.C. level.

In a variation of the above format, the time interval between edge E0 and E2 always is less than one-half of the total waveform period, and the binary divider generates a greater average D.C. level on that output which goes negative in response to edge E0.

BRIEF DESCRIPTION OF THE DRAWINGS

FIG. 1 is a block diagram depicting the apparatus of the invention combination.

FIGS. 2 and 7 are schematic diagrams of a first embodiment of the modulator means and of the demultiplexer portion of the apparatus of FIG. 1.

FIGS. 3A-3F are graphs of waveforms generated at various points along the circuit of FIG. 2.

FIG. 4 is a graph of a waveform depicting an embodiment of the modulation format of the invention.

FIG. 5 is a schematic diagram of the edge discriminator means of FIG. 1.

FIGS. 6A, 6B are graphs of waveforms generated from the waveform of FIG. 4 during the edge discrimination process.

FIGS. 8A-8G are graphs of waveforms generated at various points along the circuit of FIG. 7.

FIGS. 9 and 11 are schematic diagrams of further embodiments of the modulator means and of the demultiplexer portion of the aparatus of FIG. 1.

FIGS. 10A-10H and 12A-12G are graphs of waveforms generated at various points along the circuits of FIGS. 9 and 11, respectively.

DESCRIPTION OF THE PREFERRED EMBODIMENTS

Referring to FIG. 1, there is shown, by way of example, apparatus for generating the modulation format in response to wideband red, green, and blue (RGB) video signals, for transmitting the encoded multiplexed signals, and for demultiplexing and decoding the transmitted multiplexed signals, in accordance with the invention. To this end, in a generating circuit 10, three wideband signals corresponding to the RGB video signals are applied to respective sample/hold amplifier circuits 12, 14, 16 via three input terminals 18, 20, 22 of corresponding channels 1, 2 and 3. The sample/hold amplifier circuits are driven at a clock frequency F via oscillator means 24 coupled thereto. The sampled video signals S1, S2, S3 are fed to modulator means 26 along with the clock frequency F from the oscillator means 24. The modulated video signals are used to drive light emitting diode (LED) means 28 (or laser diode, etc.) via a driver circuit 30. The waveform of the modulated video signal from the modulator means 26 is variously depicted in FIGS. 3F, 4 and 10H, and defines alternative modulation formats in accordance with the invention.

Thus, the multiple, (multiplexed) modulated video signals are fed via the LED means 28 to a single optical fiber cable 32 for transmission to a receiving circuit 34. The signals are received by photodiode means 36 and the electrical equivalent thereof and are fed to a preamplifier 38. The amplified signals are introduced to edge discriminator means 40 and also to demultiplexer/demodulator means 42. The edge discriminator means 40 is coupled to phase locked oscillator means 44, which in turn is also coupled to the demultiplexer/demodulator means 42. The latter means 42 provides the (three) demodulated output video signals on corresponding channels, 1, 2 and 3 via output terminals 46, 48 and 50.

In an alternate, more simplified embodiment, the sample/hold amplifier circuits 12, 14, 16 may be omitted from the system entirely, and the RGB color signals on terminals 18, 20, 22 are introduced directly to the modulator means 26. In such a simplified system, "natural" sampling of the video signals take place, in contrast to the system using the sample/hold amplifier circuits (FIG. 1) wherein a "uniform" sampling approach is used. Omitting the sample/hold circuits causes some high frequency inter-modulation distortion, which is acceptable in the present video signal system in exchange for the complexity which is added when using the sample/hold circuits. However, if the ultimate in performance is required, the sample/hold amplifier circuits may be included as shown in FIG. 1.

FIG. 2 exemplifies one implementation of the modulator means 26 which directly receives the RGB color signals from input terminals 18, 20, 22, respectively, in the natural sampling approach of previous mention. The signals are fed to one side of a series of differential comparators 52, 54, 56 formed of respective pairs of transistors with their emitters coupled together and, particularly, are coupled to a base of each transistor pair. The other side of the comparators is coupled via the other transistor bases to a triangular wave signal via terminal 58. The collectors of the transistors are operatively coupled to a positive voltage source as at 60. A current source, such as negative voltage 62, is coupled to the differential comparators, wherein a transistor 64 provides the current source for comparator 52. In comparators 54, 56 the current is selectively steered thereto via transistors 66, 68 which, in turn, are responsive to a square wave signal introduced to their respective bases via terminal 70. The triangular and square wave signals are generated by the oscillator means 24 of FIG. 1, wherein the square wave risetimes correspond exactly to the turn-over points of the triangular wave, as further desribed below.

The outputs of the comparators 52 and 56 are coupled to a NOR gate 72, and that of comparator 54 is coupled to an inverter 74. The outputs of gate 72 and inverter 74 are coupled together and provide, at an output terminal 76, the composite modulated waveform which exhibits a desired modulation format which is used to drive the LED means 28.

Referring also to FIG. 3, in operation, the differential comparators 52, 54, 56 compare the triangular wave signal of terminal 58 (FIG. 3A) with the instantaneous voltages of the RGB color signals received at terminals 18, 20, 22. The current source 62 is selectively coupled to the comparators in response to the square wave signals applied to terminal 70 (FIG. 3B). Note that the risetimes of FIG. 3B correspond to the turn-over points of the triangular wave of FIG. 3A. When the color signal equals the value of the triangular wave signal, the transistors of the respective comparators 56, 54, 52 change states to generate three unique sets of pulses whose waveforms are herein depicted in FIGS. 3C, 3D and 3E, respectively. The three sets of waveforms are combined via the logic NOR gate 72 and inverter 74 to provide the modulation format in the form of the composite waveform of FIG. 3F. The latter waveform corresponds to that of FIG. 4 and includes a stationary reference edge E0, a time-variable edge E1 representing the green color channel signal, a time-variable edge E2 representing the red color channel signal, and a time-variable edge E3 representing the blue color channel signal. The various waveforms of FIGS. 3A-3F are specified at specific points along the modulator circuit of FIG. 2.

Referring further to FIG. 4 as well as 3F, the modulation format waveform is further depicted with a positive-going stationary reference edge E0 and the time-variable edges consisting of negative-going edge E1, positive-going edge E2 and negative-going edge E3. As shown, the magnitudes of the video signals sampled at the outputs of sample/hold amplifier circuits 12, 14, 16 of FIG. 1, or by the modulator means 26 of the simplified embodiment of FIG. 2, determine the time deviations and thus the respective positions of the edges E1, E2 and E3 with respect to the stationary reference edge E0. Note thus that, unlike conventional pulse width modulation techniques, the modulation format herein determines the time deviations, and thus the positions of the edges E1, E2 and E3 with respect to the same stationary reference edge E0. The waveform has a period of 1/F, wherein the position of the edge E1 corresponds to the signal in channel 1 and is equal to the instantaneous value of the sampled (green) video signal. Similarly, the positions of edges E2 and E3 correspond to the magnitudes of the (red and blue) signals in channels 2 and 3, respectively.

An alternative to the format waveform of FIGS. 3F, 4, wherein the time interval between the reference edge E0 and the following edge of the same polarity, i.e., edge E2 is always less than one-half of the total waveform period of 1/F, is described below in FIGS. 9 and 10H. Note in either of the exemplary format waveforms of FIGS. 3F, 4 or 10H the next time-variable edge (E2) of the same polarity as the reference edge E0 never crosses the half-way point of the total available time period of the waveform in the course of being deviated. In a practical circuit, it is obvious that the time-variable edge of the same polarity should stay a selected small time value from the half-way point.

The photodiode means 36 and its preamplifier 38 are the main sources of noise in the system. The effect of this noise is minimized by allowing the risetimes of the edges E0, E1, E2 and E3 to be limited only by light dispersion in the optical fiber of cable means 32, and by allowing the sampled video signals to deviate their respective edges as much as possible, i.e., by using the highest possible modulation index. The total time available for deviation is equal to the sampling interval (1/F) less the sum of the risetimes of edges E0, E1, E2, E3, wherein the risetime of the reference edge E0 is the only "wasted" time of the waveform.

The circuits employ emitter coupled logic, high speed transistors and low value load resistors to meet the very high speed requirements. By way of example only, the edge risetimes are of the order of a nanosecond or less, and the period 1/F of the format waveforms is equal to 62½ nanoseconds. Thus, there is a total deviation time of 58.5 nanoseconds available for all three time-variable edges E1, E2 and E3.

Referring to FIG. 5, the edge discriminator means 40 includes a binary divider 78 with complimentary outputs Q and $\bar{Q}$ which trigger on selected edges of the received modulation format waveform. The outputs Q and $\bar{Q}$ are fed to switch means 80 as well as to the positive and negative inputs, respectively, of a D.C. level comparator 82 via resistors 84. The inputs to the comparator 82 are coupled to ground via capacitors 86, which define in effect a low pass smoothing filter. Thus, the switch means 80 is controlled via the D.C. levels detected by the comparator means 82.

By way of further illustrating the modulation formats of FIGS. 3F, 4 (and 10H), once the format waveform is generated via the generating circuit 10, and the multiple modulated signals are transmitted via the optical fiber cable means 32, it is necessary, in order to demultiplex and demodulate the waveform, to first identify the reference edge E0 and then use it to phase lock the phase locked oscillator means 44 running at the sampling frequency F of the oscillator means 24. Because edge E2 has the same positive-going polarity as the reference edge E0, i.e., is the next edge with the same polarity, it is necessary to discriminate between them. It happens that in the RGB color video generation system, in which the modulation format is described here by way of example only, it is preferable that the signal-to-noise ratio of one channel, i.e., the green signal channel, be considerably greater than those of the red and blue signal channels. This is because the green signal has the greatest influence on the quality of the picture. Such a signal-to-noise relation is readily achieved by allotting more of the total available deviation time for the corresponding edge (E1 in FIGS. 3F, 4, and E3 in FIG. 10H) of the particular channel (green channel 1). There results the time period relationship of previous mention, viz, that the time interval between edges E0 and E2 always exceeds one-half of the total waveform period as in FIGS. 3F, 4, or in the variation thereof, that the time interval between edges E0 and E2 is always less than one-half of the total waveform period as in FIG. 10H. Another way of stating the relationship is that the next edge (E2) of the same polarity as the stationary reference edge (E0) never crosses, i.e., only approaches, the half-way point of the total time period of the waveform in the course of being deviated.

Either of the above conditions provides for readily demultiplexing the received signals via receiving circuit 34. To this end, in FIG. 5, the received signal corresponding to the waveform of FIG. 4 is applied to the binary divider 78 with complimentary outputs Q and $\bar{Q}$ (see FIGS. 6A and 6B) which triggers on edges E0 and E2. Assuming that the phase locked oscillator means 44 locks to positive-going edges, as when employing the format waveform of FIGS. 3F, 4, it is necessary to select that output of the binary divider 78 which has the waveform of FIG. 6A. This is accomplished by comparing the average D.C. levels of the two outputs Q and $\bar{Q}$ via the comparator 82, and by selecting the output which has the greatest average D.C. level. This is accomplished via the switch means 80 in response to the comparator 82 output.

When employing the format waveform of FIG. 10H, since the phase locked oscillator means 44 locks to positive-going edges, it is still necessary to select the output of the binary divider 78 which has the waveform of FIG. 6A. Thus the comparator 82 and switch 80 are rearranged to select the output which has the smallest average D.C. level.

FIG. 7 depicts, by way of example only, one circuit which may be employed as the demultiplexer portion of the demultiplexer/demodulator means 42 (FIG. 1), to demultiplex the transmitted signals prior to demodulating them. The generated waveforms are depicted in FIGS. 8A–8G. Thus the demultiplexer employs RGB D-type flip-flops 88, 90 and 92, respectively. The transmitted format waveform depicted in FIG. 8A is fed from the preamplifier 38 (FIG. 1) to the red D-type flip-flop 88 via line 94, as well as to both inputs of a NOR gate 96. The phase locked oscillator 44 (FIG. 1) supplies a clock shown in FIG. 8B, which comprises a 16 megahertz square wave phase locked to the stationary reference edge E0. The phase relationship between the edge E0 and the (positive-going) edge of the phase locked oscillator means clock is shown in FIGS. 8A and 8B. The clock is fed via a line 97 to the set input of the flip-flop 88 via a (eight nanosecond) monostable multivibrator 98, to the set input of the blue flip-flop 90 and to the set input of the green flip-flop 92 via a NOR gate 100. The NOR gate 96 is coupled to the clock inputs of the flip-flops 90 and 92 while the output of the flip-flop 90 is coupled to a second input of the NOR gate 100.

To decode the red channel signal, the positive edge of the clock of FIG. 8B generates a sharp (8 ns) pulse in the monostable multivibrator 98 (FIG. 8C) which resets the red flip-flop 88. The next positive-going time-variable edge (E2) of the format waveform at the clock input to the red flip-flop 88 sets it back. Thus the output of the red flip-flop 88 is a negative-going edge fixed in time followed by a positive-going edge which varies in position with respect to the reference edge E0 in accordance with the red channel signal, i.e., the red color signal edge E2 (FIG. 8D).

To decode the blue channel signal, the clock resets the blue flip-flop 90, and the positive-going edge which is fed to the clock input of the flip-flop 90 resets the latter. Since the next positive-going edge is generated by the inverting action of the NOR gate 96 from the blue channel time-variable edge E3 of the format waveform on line 94, it is the position of the blue color signal edge E3 which determines the reset of the blue flip-flop 90. Thus the output of the blue flip-flop 90 is a negative-going edge fixed in time, followed by a positive-going edge whose position varies with respect to the reference edge E0 in accordance with the blue channel signal, i.e., the blue color signal edge E3 (FIG. 8E).

To decode the green channel signal, a NOR combination of the blue flip-flop demodulated output and the clock generates a positive-going edge which resets the green flip-flop 92 (FIG. 8F) and the next positive-going edge fed to the clock input to the flip-flop 92 sets it back. It is the green color signal edge E1 which sets the flip-flop 92, whereby the green flip-flop 92 generates the waveform of FIG. 8G.

The various waveforms of FIGS. 8A-8G are specified at specific points along the demultiplexer circuit of FIG. 7.

Thus the output of the demultiplexer of FIG. 7 consists of three signals, each of which contains a stationary edge related to the reference edge E0, and an edge which varies in time in accordance with the position of the respective edges E1, E2 and E3 of the color channel signals. The demultiplexed red, blue, and green signals are fed to the demodulator portion of the demultiplexer/demodulator means 42 which converts the time-variable edges into corresponding voltages with conventional pulse width conversion techniques. The voltages are filtered and provide the RGB color signals on output terminals 46, 48 and 50 of FIG. 1.

FIGS. 9-12 depict alternative embodiments of circuitry and associated generated waveforms, related to the alternative modulation format, wherein the time interval between the stationary reference edge E0 and the next time-variable edge of the same polarity (E2) is less than one-half of the total waveform period (FIG. 10H). To achieve and utilize this alternative modulation format, the modulator means of FIG. 2 and the demultiplexer means of FIG. 7, respectively, are modified slightly as shown in FIGS. 9 and 11. In all FIGS., similar components are similarly numbered.

More particularly, FIG. 9 depicts a modulator means employing the inputs 58, 60, 62 and 70, the series of differential comparators 52, 54 and 56 and the current source transistors 64, 66 and 68 of FIG. 2. However, the alternative embodiment reverses the green and blue color inputs to the inputs 22, 20, respectively, of the differential comparators 56, 54. In addition, the waveform summing means of NOR gate 72 and invertor 74 are replaced by an AND gate 102 coupled to differetial comparators 54 and 56, a NOR gate 104 coupled to the comparators 54 and 52, and an OR gate 106 coupled to the gates 102, 104. The modulation format of FIG. 10H appears at output terminal 76, and includes the stationary reference edge E0 with time-variable edges E1, E2 and E3 corresponding to the red, blue, and green color signal channels, respectively.

Note the time interval between the reference edge E0 and the following edge E2 of the same polarity is always less than one-half of the total available time period of the waveform, whereas in the format of FIGS. 3F, 4 it always exceeds one-half. However, in both of the modulation formats the condition exists that the next edge E2 of the same polarity as the reference edge E0 never crosses, i.e., only approaches, the half-way point of the total time period of the waveform, in the course of being deviated.

The waveforms of FIGS. 10A-10H, which are identified at various points along the modulator means of FIG. 9, correspond generally to those previously described in FIGS. 3A-3F with reference to FIG. 2 and, accordingly, are not believed to require further description herein.

The alternative multiplexer circuit of FIG. 11 corresponds closely to that of FIG. 7 and employs the inputs 94 and 97, the D-type flip-flops 88, 90 and 92 and the NOR gates 96 and 100. In adapting the demultiplexer to the modulation format of FIG. 10H, however, the circuit couples the phase locked oscillator means clock (FIG. 12B) directly to the set input of flip-flop 88, to the set input of flip-flop 90 via a (twenty nanosecond) monostable multivibrator 108, and to the set input of the flip-flop 92 via the multivibrator 108 and the NOR gate 100. The outputs of the flip-flops 88, 90 and 92 differ in that they supply the blue, green, and red color signal edges E2, E3 and E1, respectively, as depicted in FIGS. 12C, 12E and 12G.

The generation of the various waveforms of FIGS. 12A-12G, which are identified at various points along the demultiplexer means of FIG. 11, corresponds generally to that of the FIGS. 8A-8G of previous description with reference to FIG. 7 and, accordingly, is not believed to require further description herein.

I claim:

1. A circuit for generating and utilizing a modulation format for transmitting multiple wideband signals of respective signal channels via a single optical fiber, the combination comprising;

generating means including modulator means for generating said modulation format in the form of a waveform of a given time period having a stationary reference edge and multiple time deviable edges, wherein the position of each latter edge is time varied relative to the stationary reference edge in accordance with respective sampled signals of the corresponding signal channels, and;

receiving means including demultiplexer means operatively coupled to the generating means via said single optical fiber, for detecting the stationary reference edge and for separating the multiple time deviable edges with respect to the stationary reference edge to recover the multiple wideband signals.

2. The circuit of claim 1 wherein the next time deviable edge of the same polarity as the stationary reference edge only approaches and never crosses the half-way point of the total waveform period in the course of its deviation.

3. The circuit of claim 2 wherein at least two wideband signals of two corresponding signal channels are modulated via the modulation format by corresponding time deviations of respective time deviable edges.

4. The circuit of claim 2 wherein three wideband signals of three corresponding signal channels are modulated via the modulation format by corresponding time deviations of respective time deviable edges.

5. The circuit of claim 2 wherein the wideband signals correspond to color components of a composite color video signal, and wherein a selected color component is represented by the multiple time deviable edge which has the greatest time deviation.

6. The circuit of claim 5 wherein the generating means includes;

sampling means for sampling at a given frequency each wideband signal of respective signal channels; and wherein the sampled signals of respective channels deviate in time with the respective deviable edges in accordance with the sampled values at the given frequency.

7. The circuit of claim 6 wherein the modulator means includes;
   oscillator means for generating a selected driving waveform of said given sampling frequency; and
   a differential comparator in each channel for comparing the level of the driving waveform with the respective wideband signals to determine the positions of the respective time deviable edges.

8. The circuit of claim 7 wherein;
   the receiving means includes edge discriminator means for detecting the stationary reference edge, and for detecting the next time deviable edge of the same polarity which never crosses the half-way point of the total waveform period.

9. The circuit of claim 8 wherein;
   the edge discriminator means includes, binary divider means with complimentary outputs, and comparator means coupled to the complimentary outputs for selecting that output thereof which goes positive in response to the reference edge.

10. The circuit of claim 9 wherein the receiving means further includes;
    light detecting means coupled to the single optical fiber to receive the transmitted modulation format;
    phase locked oscillator means selectively coupled to the complimentary outputs of the binary divider means in response to the comparator means; and
    wherein the demultiplexer means is coupled to the light detecting means and to the phase locked oscillator means.

11. The circuit of claim 10 wherein;
    said sampling means includes a sample/hold circuit in each wideband signal channel, and clock means for driving the sample/hold circuits at the given frequency.

12. The circuit of claim 10 wherein the modulator means further includes transistor pairs defining the differential comparator in each signal channel, current source means selectively coupled to each of the transistor pairs, and gate means coupled to the transistor pairs to generate the modulation format.

13. The circuit of claim 12 wherein;
    the comparator means is coupled to the complimentary outputs of the binary divider means to select the output thereof with the greatest average D.C. level to define the portion of the waveform period which always exceeds one-half of the total waveform period.

14. The circuit of claim 13 further including switch means coupled to the complimentary outputs of the binary divider means and responsive to the comparator means to select the output with the greatest average D.C. level.

15. The circuit of claim 14 wherein;
    the demultiplexer means includes flip-flop means in each signal channel responsive to the phase locked oscillator and to the respective time deviable edges, to selectively regenerate the time deviable edges relative to the reference edge.

16. The circuit of claim 12 wherein;
    the comparator means is coupled to the complimentary outputs of the binary divider means to select the output thereof with the smallest average D.C. level to define the portion of the waveform period which is always less than one-half of the total waveform period.

17. The circuit of claim 16 further including switch means coupled to the outputs of the binary divider means and responsive to the comparator means to select the output with the smallest average D.C. level.

18. The circuit of claim 17 wherein;
    the demultiplexer means includes flip-flop means in each signal channel responsive to the phase locked oscillator and to the respective time deviable edges, to selectively regenerate the time deviable edges relative to the reference edge.

19. A circuit for generating a modulation format for representing multiple wideband signals of respective signal channels, the combination comprising;
    waveform generating means including modulator means for generating the format in the form of a waveform of time period 1/F which includes a stationary reference edge, and multiple time-variable edges each of whose positions vary with respect to the stationary reference edge in accordance with sampled magnitudes of their respective signals.

20. The circuit of claim 19 wherein the next time-variable edge of the same polarity as the stationary edge may approach and never cross the half-way point of the total available waveform time period in the course of being deviated.

21. The circuit of claim 20 wherein;
    the time interval between the stationary reference edge and the next time-variable edge of the same polarity always exceeds one-half of the total waveform period.

22. The circuit of claim 20 wherein;
    the time interval between the stationary reference edge and the next time-variable edge of the same polarity is always less than one-half of the total waveform period.

23. A method for providing an improved modulation format which is capable of representing multiple wideband signals of respective signal channels, comprising the steps of;
    selectively sampling at a given sampling frequency each of the wideband signals to determine their instantaneous values; and
    generating the modulation format as a waveform of a given time period, with a stationary reference edge, and with multiple time deviable edges each of whose positions with respect to the stationary reference edge varies in time in accordance with the respective sampled wideband signals.

24. The method of claim 23 wherein the step of generating the time deviable edges includes generating a next time deviable edge of the same polarity as the reference edge which may approach and never cross the half-way point of the given waveform time period in the course of its deviation.

25. The method of claim 24 further providing for utilizing the modulation format representing the multiple wideband signals, and including the steps of;
    transmitting the waveform via a single optical fiber;
    detecting the stationary reference edge of the transmitted waveform; and
    demultiplexing the time deviable edges with respect to the stationary reference edge to retrieve the wideband signals.

26. The method of claim 25 further comprising;

generating a triangular wave of said given sampling frequency;

comparing the levels of the triangular wave with each of the respective wideband signals to determine the positions of the respective time deviable edges with respect to the stationary reference edge.

27. The method of claim 26 wherein the step of detecting the stationary reference edge includes;

comparing the average D.C. levels of a pair of complimentary outputs to select that output which goes positive in response to the reference edge.

28. The method of claim 27 wherein the step of demultiplexing the time deviable edges includes;

maintaining a phase locked oscillator at the given sampling frequency; and regenerating the time deviable edges with respect to the stationary reference edge.

* * * * *